US012443069B2

(12) United States Patent
Hu et al.

(10) Patent No.: US 12,443,069 B2
(45) Date of Patent: Oct. 14, 2025

(54) DISPLAY PANEL AND DISPLAY DEVICE (71) Applicants: Fuzhou BOE Optoelectronics Technology Co., Ltd., Fujian (CN); BOE Technology Group Co., Ltd., Beijing (CN)

(72) Inventors: Zhang Hu, Beijing (CN); Yubin Lin, Beijing (CN); Chen Lin, Beijing (CN); Qian Zhang, Beijing (CN); Xi Chen, Beijing (CN); Anshan Chen, Beijing (CN); Tingwei Chen, Beijing (CN); Min Feng, Beijing (CN); Lijie Li, Beijing (CN); Jia Liu, Beijing (CN); Guowei Ma, Beijing (CN); Minshang Quan, Beijing (CN); Xuexin Yang, Beijing (CN); Shoude Zhang, Beijing (CN); Xuzhou Chen, Beijing (CN); Zekai Chen, Beijing (CN); Yangqing Wang, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 24 days.

(21) Appl. No.: 18/563,995

(22) PCT Filed: Oct. 25, 2021

(86) PCT No.: PCT/CN2021/125987
§ 371 (c)(1),
(2) Date: Nov. 24, 2023

(87) PCT Pub. No.: WO2022/247125
PCT Pub. Date: Dec. 1, 2022

(65) Prior Publication Data
US 2024/0280852 A1 Aug. 22, 2024

(30) Foreign Application Priority Data

May 28, 2021 (CN) .......................... 202110590431.8

(51) Int. Cl.
G02F 1/1335 (2006.01)
G02F 1/1339 (2006.01)

(52) U.S. Cl.
CPC ...... G02F 1/133512 (2013.01); G02F 1/1339 (2013.01)

(58) Field of Classification Search
None
See application file for complete search history.

(56) References Cited

U.S. PATENT DOCUMENTS

2013/0088672 A1* 4/2013 Shin .................. G02F 1/1345
349/110
2016/0238878 A1 9/2016 Kim et al.
2020/0133052 A1 4/2020 Gu et al.

FOREIGN PATENT DOCUMENTS

CN 101673008 A 3/2010
CN 103048824 A 4/2013
(Continued)

Primary Examiner — Angela M. Medich
(74) Attorney, Agent, or Firm — Nath, Goldberg & Meyer; Joshua B. Goldberg (57) ABSTRACT The present disclosure provides a display panel and a display device, the display panel includes: an array substrate and an opposite substrate disposed oppositely, the array substrate having a ground terminal, the opposite substrate including a black matrix and a transparent conductive layer, the black matrix including a first part, a second part and an isolation trench which are sequentially disposed, and the isolation trench isolating the first part from the second part; a conductive adhesive connecting the ground terminal with the transparent conductive layer, a part of the conductive adhesive being between the array substrate and the opposite (Continued)

substrate, and orthographic projections of the part of the conductive adhesive and the first part on the array substrate being not overlapped; and a blocking structure in contact with the part of the conductive adhesive and configured for preventing the conductive adhesive from overflowing to the first part.

19 Claims, 8 Drawing Sheets

(56) References Cited

FOREIGN PATENT DOCUMENTS

| | | |
|---|---|---|
| CN | 105161506 A | 12/2015 |
| CN | 105717710 A | 6/2016 |
| CN | 206470500 U | 9/2017 |
| CN | 206848640 U | 1/2018 |
| CN | 109828402 A | 5/2019 |
| CN | 110286531 A | 9/2019 |
| CN | 209674137 U | 11/2019 |
| CN | 110794991 A | 2/2020 |
| CN | 111192883 A | 5/2020 |
| JP | 2007-17474 A | 1/2007 |

* cited by examiner

DISPLAY PANEL AND DISPLAY DEVICE

CROSS-REFERENCE TO RELATED APPLICATIONS

This is a National Phase Application filed under 35 U.S.C. 371 as a national stage of PCT/CN2021/125987, filed Oct. 25, 2021, an application claiming the benefit of Chinese Application No. 202110590431.8, filed May 28, 2021, the content of each of which is hereby incorporated by reference in its entirety.

TECHNICAL FIELD

The embodiments of the present disclosure relates to the field of display technology, and in particular, relates to a display panel and a display device.

BACKGROUND

Liquid Crystal Display (LCD) panels have the advantages of light weight, low power consumption, low radiation, and portability, and are widely used in modern information devices such as displays, televisions, mobile phones, and digital products.

SUMMARY

The embodiments of the present disclosure provide a display panel and a display device, and the specific technical solutions are as follows.

In an aspect, an embodiment of the present disclosure provides a display panel, including: an array substrate which includes a display area and a frame area disposed around the display area, at least part of the frame area on a side of the display area serving as a bonding area, and the bonding area of the array substrate being provided therein with a ground terminal; an opposite substrate opposite to the array substrate, an orthographic projection of the opposite substrate on the array substrate being not overlapped with the bonding area, the opposite substrate including a black matrix disposed on a side of the opposite substrate facing the array substrate, and a transparent conductive layer disposed on a side of the opposite substrate away from the array substrate, the black matrix including a first part, a second part and an isolation trench, the first part, the isolation trench and the second part being sequentially disposed in a direction from the display area to the bonding area, and the isolation trench isolating the first part from the second part; a conductive adhesive connecting the ground terminal with the transparent conductive layer, a part of the conductive adhesive being filled between the array substrate and the opposite substrate, and an orthographic projection of the part of the conductive adhesive on the array substrate is not overlapped with an orthographic projection of the first part on the array substrate; and a blocking structure filled between the array substrate and the opposite substrate, the blocking structure being in contact with the part of the conductive adhesive and configured for preventing the conductive adhesive, before being cured, from overflowing into a region where the first part is located.

In some implementations, in the display panel provided by the embodiment of the present disclosure, the opposite substrate includes a first side surface adjacent to the bonding area, the isolation trench includes a first isolation sub-trench parallel to the first side surface, and a second isolation sub-trench and a third isolation sub-trench which extend to the first side surface respectively from two ends of the first isolation sub-trench.

In some implementations, in the display panel provided by the embodiment of the present disclosure, an orthographic projection of the blocking structure on the array substrate covers at least an orthographic projection of the first isolation sub-trench on the array substrate.

In some implementations, in the display panel provided by the embodiment of the present disclosure, an orthographic projection of the blocking structure on the array substrate covers orthographic projections of a part of the second isolation sub-trench close to the first isolation sub-trench and a part of the third isolation sub-trench close to the first isolation sub-trench on the array substrate.

In some implementations, in the display panel provided by the embodiment of the present disclosure, an orthogonal projection of the blocking structure on the array substrate covers an orthogonal projection of an edge of the second part, adjacent to the first isolation sub-trench, on the array substrate.

In some implementations, in the display panel provided by the embodiment of the present disclosure, an orthographic projection of the blocking structure on the array substrate covers an orthographic projection of an edge of the first part, adjacent to the first isolation sub-trench, on the array substrate.

In some implementations, the display panel provided by the embodiment of the present disclosure further includes a sealant surrounding the display area, and the isolation trench is disposed on a side of the sealant close to the bonding area.

In some implementations, in the display panel provided by the embodiment of the present disclosure, the sealant serves as the blocking structure.

In some implementations, in the display panel provided by the embodiment of the present disclosure, the sealant and the first isolation sub-trench satisfy a relation of $C>A-(1-i)*W/2$, the opposite substrate includes a first side surface adjacent to the bonding area, A is a distance between an orthographic projection of a center line, in a direction parallel to the first side surface, of the sealant on the array substrate and an orthographic projection of the first side surface on the array substrate, W is a preset width of the sealant in a direction perpendicular to the first side surface, C is a distance between the first isolation sub-trench and the first side surface, and i is a fluctuation coefficient of the width of the sealant in a range of ±10%.

In some implementations, in the display panel provided by the embodiment of the present disclosure, the blocking structure is disposed on a side of the sealant close to the bonding area, and a gap is formed between the blocking structure and the sealant.

In some implementations, in the display panel provided by the embodiment of the present disclosure, the blocking structure and the first isolation sub-trench satisfy following relations:

$a \leq C$: $a+(1+i')*W'/2<D$; $a-(1+i')*W'/2>0$; $e \geq E$: the opposite substrate includes a first side surface adjacent to the bonding area, a is a distance between an orthographic projection of a center line, in a direction parallel to the first side surface, of the blocking structure on the array substrate and an orthographic projection of the first side surface on the array substrate, C is a distance between the first isolation sub-trench and the first side surface, D is a distance between an orthographic projection of the blocking structure on the array substrate and an orthographic projection of the first side surface on the array substrate, E is a length of the first isolation sub-trench in the direction parallel to the first side surface, W' is a preset width of the blocking structure in a direction perpendicular to the first side surface, i' is a fluctuation coefficient of the width of the blocking structure in a range of ±10%, and e is a length of the blocking structure in the direction parallel to the first side surface.

In some implementations, in the display panel provided by the embodiment of the present disclosure, the opposite substrate includes a first side surface adjacent to the bonding area, isolation trenches are disposed at two edges of the first side surface, and the isolation trenches are disposed between the display area and the bonding area.

In some implementations, the display panel provided by the embodiment of the present disclosure further includes: a liquid crystal layer disposed in the display area and sealed between the opposite substrate and the array substrate.

In some implementations, in the display panel provided by the embodiment of the present disclosure, the array substrate further includes a common electrode layer and a pixel electrode layer disposed in the display area, and the common electrode layer and the pixel electrode layer are stacked and insulated from each other.

In some implementations, the display panel provided by the embodiment of the present disclosure further includes: a planarization layer fully disposed on a side, facing the array substrate, of the black matrix.

In some implementations, in the display panel provided by the embodiment of the present disclosure, the conductive adhesive is a conductive silver adhesive.

In another aspect, an embodiment of the present disclosure further provides a display device, including the display panel provided by the embodiment of the present disclosure.

DETAILED DESCRIPTION

To make objects, technical solutions and advantages of the embodiments of the present disclosure more apparent, the technical solutions of the embodiments of the present disclosure will be clearly and completely described below with reference to the drawings of the embodiments of the present disclosure. It should be noted that sizes and shapes of various figures in the drawings are not to scale, but are merely intended to schematically illustrate the present disclosure. Moreover, like reference numerals refer to like or similar elements or elements having like or similar functions throughout. It is to be understood that the described embodiments are only a few embodiments of the present disclosure, and not all embodiments. All other implementations, which can be derived by a person skilled in the art from the described embodiments of the present disclosure without any creative effort, are intended to be within the protection scope of the present disclosure.

Unless defined otherwise, technical or scientific terms used herein shall have the ordinary meaning as understood by one of ordinary skill in the art to which the present disclosure belongs. The terms "first," "second," and the like, as used in the description and in the claims, do not denote any order, quantity, or importance, but rather are used to distinguish one element from another. The word "comprising/including" or "comprise/include", and the like, means that the element or item preceding the word contains the element or item listed after the word and its equivalent, but does not exclude other elements or items. Terms "inner/in/within", "outer/outside", "upper/on", "lower/below", and the like are used merely to indicate relative positional relationships, and if the absolute position of the object being described is changed, the relative positional relationships may be changed accordingly.

Currently, liquid crystal display panels are mainly classified into: modes of Twisted Nematic (TN), Vertical Alignment (VA), In-Plane Switching (IPS), Advanced Super Dimension Switching (ADS). In the liquid crystal display panel of the ADS mode, a multidimensional electric field is formed by an electric field generated by edges of electrodes in a same plane and an electric field generated between a strip-shaped electrode layer and a plate-shaped electrode layer, so that all liquid crystal molecules between the electrodes and right above the electrodes rotate, and in order to shield from an influence of an external electric field on the liquid crystal molecules, a layer of Indium Tin Oxide (ITO) (i.e., ITO film layer) is coated on a back surface of an opposite substrate (also called a color filter substrate, abbreviated as a CF substrate), and the ITO film layer is grounded, so that the purpose of shielding from the external electric field is achieved.

Figure 1:
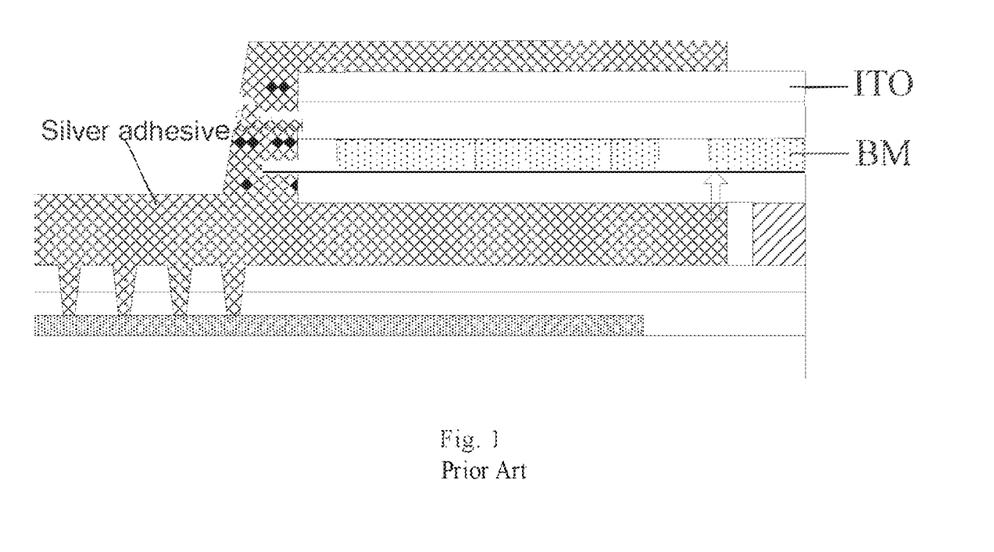
FIG. 1 is a schematic diagram illustrating a principle in the related art that a black matrix is electrified due to a conductive silver adhesive.

In order to achieve the purpose of grounding the ITO film layer on the back surface of the CF substrate, the ITO film layer on the back surface of the CF substrate is usually conducted with a ground line on the array substrate (i.e., the TFT substrate) through a silver adhesive. A gap exists between the TFT substrate and the CF substrate due to a support of a sealant, the silver adhesive, before being cured, may permeate into the gap, so that a black matrix (BM) is electrified, a voltage difference between the black matrix and an electrode on the array substrate is increased, a deflection of the liquid crystal molecules is caused, pixels are lightened, and a phenomenon of greenish screen may occur due to the obvious lightening of green pixels, and the quality of a product is seriously influenced. To avoid above, as shown in FIG. 1, the BM in the vicinity of points coated with the sliver adhesive is trenched in the related art to isolate the region affected by coating the sliver adhesive. However, in actual producing processes, the silver adhesive may still exceed the region isolated and permeate to the BM, so that the entire screen of the product is greenish, and the yield is reduced.

In order to solve at least one of above technical problems in the related art, an embodiment of the present disclosure provides a display panel, as shown in FIGS. 2 to 9, the display panel includes: an array substrate 01, an opposite substrate 02, a conductive adhesive 03 and a blocking structure 04.

The array substrate 01 includes a display area AA and a frame area BB disposed around the display area AA, at least part of the frame area BB on a side of the display area AA serves as a bonding area b, and the array substrate 01 is provided with a ground terminal 101 in the bonding area b. The opposite substrate 02 is disposed opposite to the array substrate 01, an orthographic projection of the opposite substrate 02 on the array substrate 01 is not overlapped with the bonding area b, i.e., the bonding area b of the array substrate 01 extends out of the opposite substrate 02. The opposite substrate 02 may include a black matrix 201 disposed on a side of the opposite substrate 02 facing the array substrate 01, and a transparent conductive layer 202 disposed on a side of the opposite substrate 02 away from the array substrate 01. The black matrix 201 includes a first part 2011, a second part 2012 and an isolation trench 2013, and in a direction Y from the display area AA to the bonding area b, the first part 2011, the isolation trench 2013 and the second part 2012 are disposed in sequence, and the isolation trench 2013 isolates the first part 2011 from the second part 2012. The conductive adhesive 03 connects the ground terminal 101 with the transparent conductive layer 202, a part of the conductive adhesive 03 is filled between the array substrate 01 and the opposite substrate 02, and an orthographic projection of the part of the conductive adhesive 03 on the array substrate 01 is not overlapped with an orthographic projection of the first part 2011 on the array substrate 01. The blocking structure 04 is filled between the array substrate 01 and the opposite substrate 02, is in contact with the part of the conductive adhesive 03, and is configured for blocking the conductive adhesive 03, before being cured, from overflowing into a region where the first part 2011 is located.

In the display panel provided by the embodiment of the present disclosure, the blocking structure 04 filled between the array substrate 01 and the opposite substrate 02 is provided for blocking the conductive adhesive 03, before being cured, from overflowing into the region where the first part 2011 is located, so that an orthographic projection of the conductive adhesive 03 between the array substrate 01 and the opposite substrate 02 on the array substrate 01 is not overlapped with the orthographic projection of the first part 2011 on the array substrate 01 in a final product, thereby preventing the conductive adhesive 03 from permeating to the first part 2011 to cause an electrification of the black matrix 201, thereby effectively solving the problem that the display panel is greenish, and improving the yield of the product.

Figure 3:
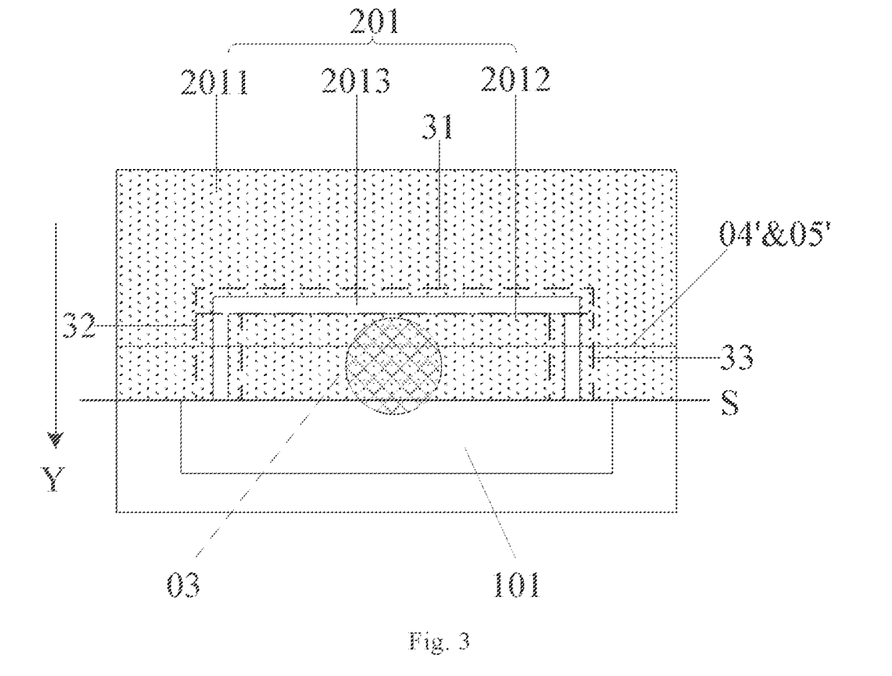
FIG. 3 is an enlarged view of a structure in a region Z of FIG. 2.
Figure 7:
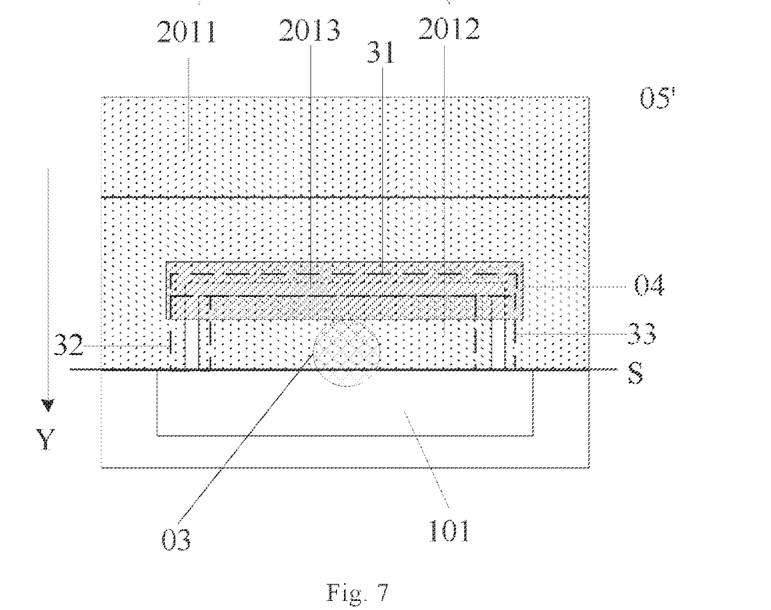
FIG. 7 is an enlarged view of a structure in a region Z' of FIG. 6.
Figure 10:
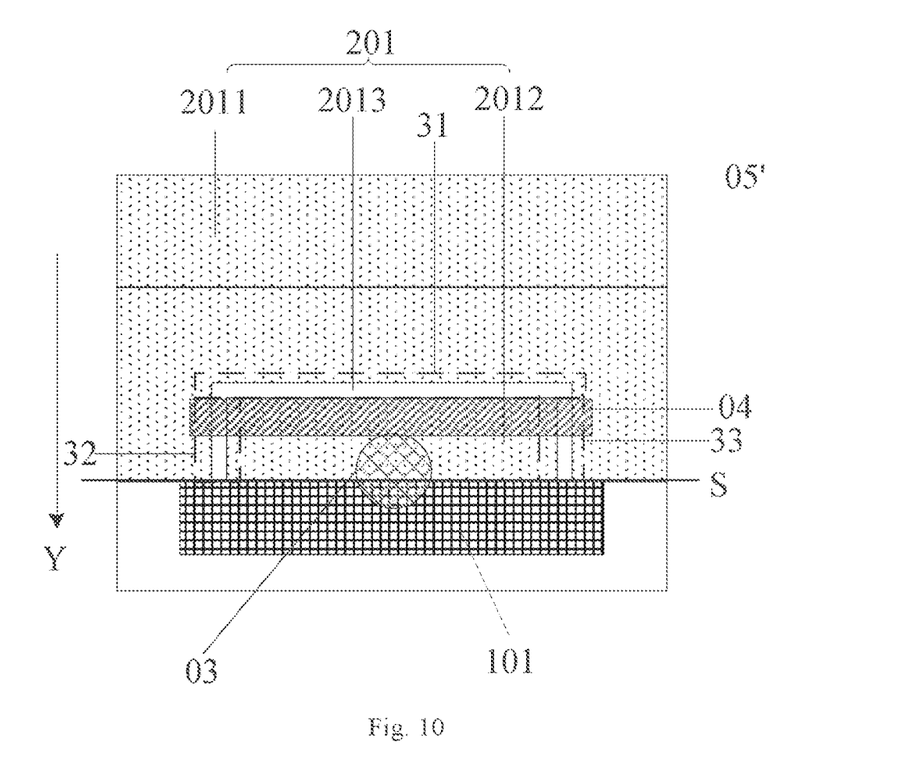
FIG. 10 is an enlarged view of another structure in the region Z' of FIG. 6.

In some implementations, in the display panel provided by the embodiment of the present disclosure, as shown in FIGS. 3, 7 and 10, the opposite substrate 02 may include a first side surface S adjacent to the bonding area b. To achieve the effect of isolating the first part 2011 from the second part 2012, the isolation trench 2013 may include a first isolation sub-trench 31 parallel to the first side surface S, and a second isolation sub-trench 32 and a third isolation sub-trench 33 respectively extending from two ends of the first isolation sub-trench 31 to the first side surface S.

In some implementations, the second isolation sub-trench 32 and the third isolation sub-trench 33 each may be perpendicular to the first side surface S; and in some implementations, an included angle between each of the second isolation sub-trench 32 and the third isolation sub-trench 33, and the first side surface S may be an non-right angle, that is, the second isolation sub-trench 32 and the third isolation sub-trench 33 each may be disposed obliquely with respect to the first side surface S.

Note that, in order to avoid light leakage at a periphery in a dark-state, a boundary of the black matrix 201 may be flush with a boundary of the opposite substrate 02. In this case, the second isolation sub-trench 32 and the third isolation sub-trench 33 are flush with the first side surface S of the opposite substrate 02 adjacent to the bonding area b. However, it should be understood that, in some implementations, the boundary of the black matrix 201 may be recessed with respect to the boundary of the opposite substrate 02, and in this case, a certain distance exists between each of the second isolation sub-trench 32 and the third isolation sub-trench 33, and the first side surface S, but the relative arrangement manner between the second isolation sub-trench 32, the third isolation sub-trench 33 and the first side surface S may be selected from the above two cases as desired, as long as the second part 2012 can be isolated from the black matrix 201.

In some implementations, in the display panel provided by the embodiment of the present disclosure, as shown in FIGS. 3, 4, 7 and 8, an orthographic projection of the blocking structure 04 on the array substrate 01 may cover at least an orthographic projection of the first isolation sub-trench 31 on the array substrate 01, so as to prevent the conductive adhesive 03, before being cured, between the array substrate 01 and the opposite substrate 02 from passing over the first isolation sub-trench 31 and overflowing into the region where the first part 2011 is located, thereby preventing the conductive adhesive 03 from permeating to the first part 2011, and further improving a greenish defect of the panel caused by the electrification of the black matrix 201.

In some implementations, in the display panel provided by the embodiment of the present disclosure, as shown in FIGS. 3, 4, 7 and 8, the orthographic projection of the blocking structure 04 on the array substrate 01 may further cover an orthographic projection of a part of the second isolation sub-trench 32 close to the first isolation sub-trench 31 on the array substrate 01, and an orthographic projection of a part of the third isolation sub-trench 33 close to the first isolation sub-trench 31 on the array substrate 01.

Since the conductive adhesive 03 is blocked by the blocking structure 04 covering the first isolation sub-trench 31, it flows toward two ends of the first isolation sub-trench 31 along the blocking structure 04. Therefore, by disposing the blocking structure 04 to cover a part of the second isolation sub-trench 32 and a part of the third isolation sub-trench 33 which are adjacent to the first isolation sub-trench 31, the conductive adhesive 03, before being cured, between the array substrate 01 and the opposite substrate 02 can be prevented from overflowing into regions, where portions of the first part 2011 at two ends of the first isolation sub-trench 31 are located, through the second isolation sub-trench 32 and the third isolation sub-trench 33 respectively, so that the conductive adhesive 03 is prevented from permeating to the first part 2011, and the greenish defect of the panel caused by the electrification of the black matrix 201 can be improved.

Figure 11:
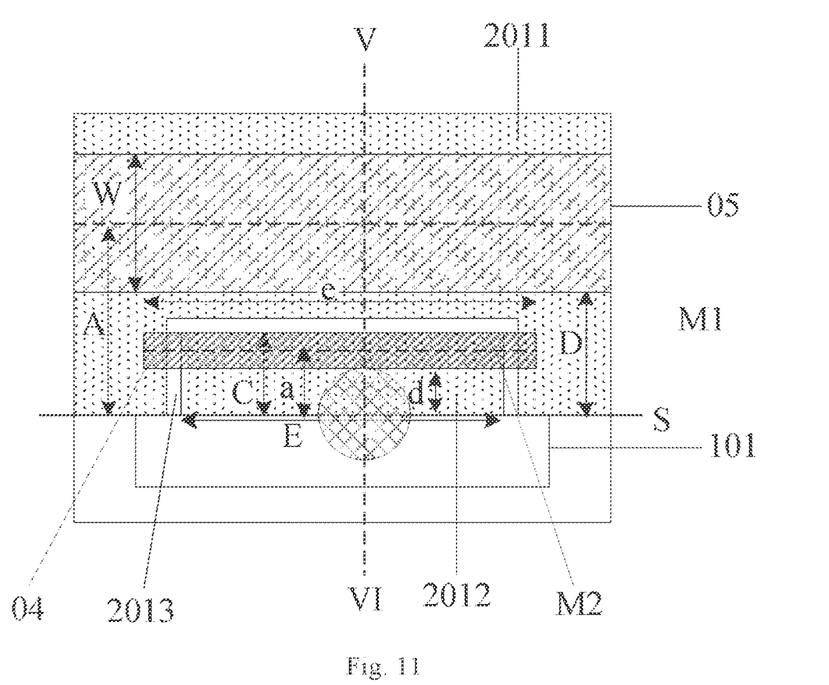
FIG. 11 is a schematic diagram illustrating a calculation of positions of a blocking structure and a first isolation sub-trench in FIG. 10.
Figure 12:
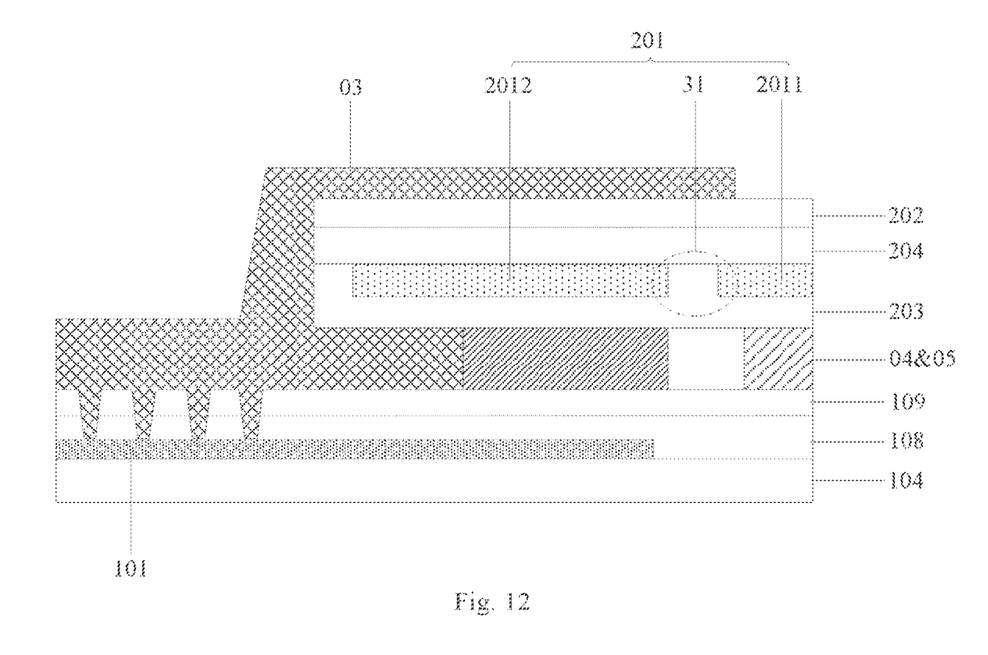
FIG. 12 is a schematic cross-sectional view taken along line V-VI in FIG. 11.

In some implementations, in the above display panel provided by the embodiment of the present disclosure, as shown in FIGS. 10 to 12, an orthographic projection of the blocking structure 04 on the array substrate 01 may only cover an orthographic projection of an edge of the second part 2012, adjacent to the first isolation sub-trench 31, on the array substrate 01 to confine the conductive adhesive 03 between the array substrate 01 and the opposite substrate 02 in an isolation region surrounded by the isolation trench 2013. In addition, the bonding area b is generally to be exposed by cutting off a part of the opposite substrate 02 corresponding to the bonding area b. In response to that the blocking structure 04 is overlapped with the edge of the second part 2012 adjacent to the first isolation sub-trench 31, the part of the opposite substrate 02 corresponding to the bonding area b can be ensured to be the same, in structure, as that in the related art, so that even the conventional cutting process is adopted for cutting, a cutting yield can be ensured, in other words, the existence of the blocking structure 04 does not affect the cutting yield.

Figure 13:
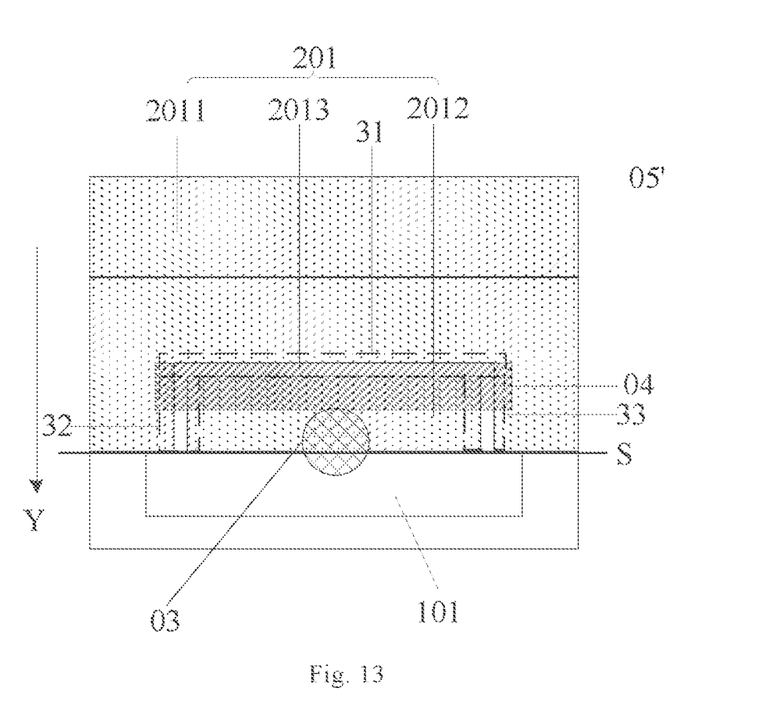
FIG. 13 is an enlarged view of another structure in the region Z' of FIG. 6.
Figure 14:
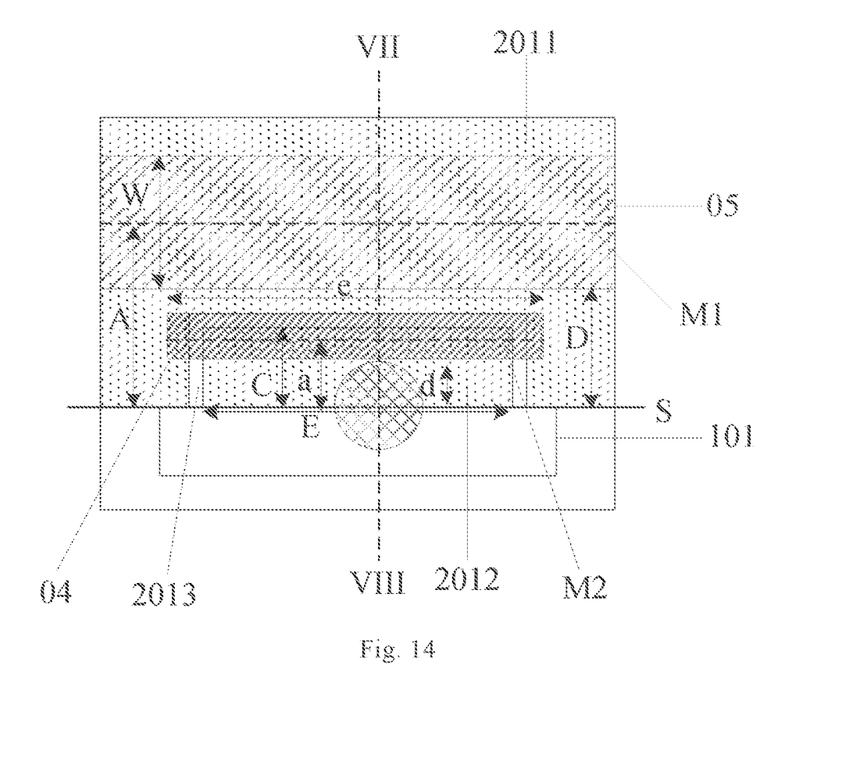
FIG. 14 is a schematic diagram illustrating a calculation of positions of a blocking structure and a first isolation sub-trench in FIG. 13.
Figure 15:
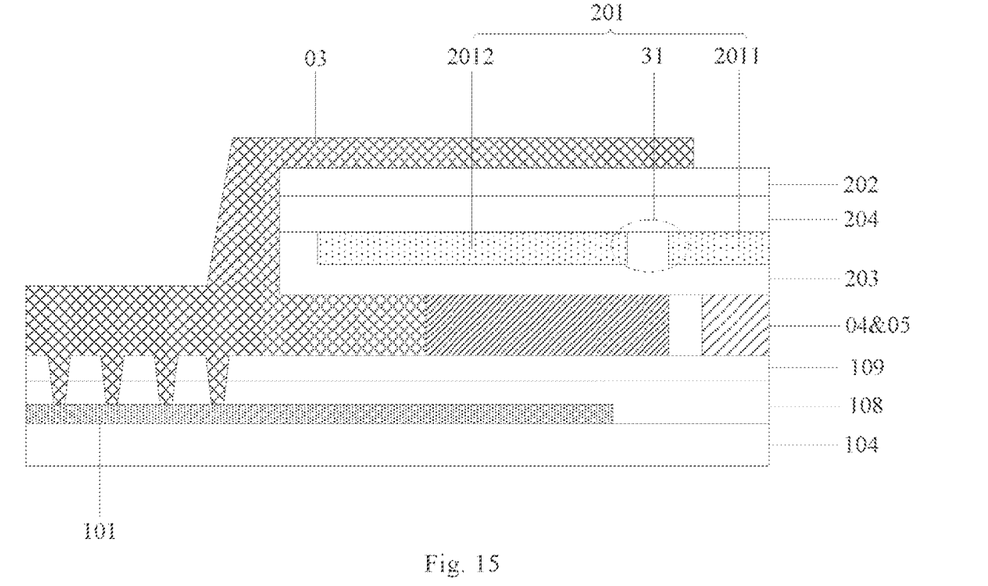
FIG. 15 is a schematic cross-sectional view taken along line VII-VIII in FIG. 14.

In some implementations, as shown in FIGS. 13 to 15, an orthographic projection of the blocking structure 04 on the array substrate 01 may cover orthographic projections of the first isolation sub-trench 31, a part of the second isolation sub-trench 32 adjacent to the first isolation sub-trench 31, a part of the third isolation sub-trench 33 adjacent to the first isolation sub-trench 31, and an edge of the second part 2012 adjacent to the first isolation sub-trench 31 on the array substrate 01 simultaneously, so as to confine the conductive adhesive 03 between the array substrate 01 and the opposite substrate 02 within an isolation region surrounded by the isolation trench 2013.

In some implementations, in the display panel provided by the embodiment of the present disclosure, as shown in FIGS. 3 to 5 and FIGS. 7 to 9, an orthographic projection of the blocking structure 04 on the array substrate 01 may cover an orthographic projection of an edge of the first part 2011 adjacent to the first isolation sub-trench 31 on the array substrate 01, so that the conductive adhesive 03 between the array substrate 01 and the opposite substrate 02 can be blocked on a side of the isolation trench 2013 away from the first part 2011, thereby preventing the conductive adhesive 03 from permeating to the first part 2011, and further improving a greenish defect of the panel caused by the electrification of the black matrix 201.

In some implementations, as shown in FIGS. 3 to 5 and FIGS. 7 to 9, an orthographic projection of the blocking structure 04 on the array substrate 01 may cover orthographic projections of the first isolation sub-trench 31, a part of the second isolation sub-trench 32 adjacent to the first isolation sub-trench 31, a part of the third isolation sub-trench 33 adjacent to the first isolation sub-trench 31, an edge of the first part 2011 adjacent to the first isolation sub-trench 31, and an edge of the second part 2012 adjacent to the first isolation sub-trench 31 on the array substrate 01 simultaneously, so as to confine the conductive adhesive 03 between the array substrate 01 and the opposite substrate 02 within an isolation region surrounded by the isolation trench 2013.

Figure 2:
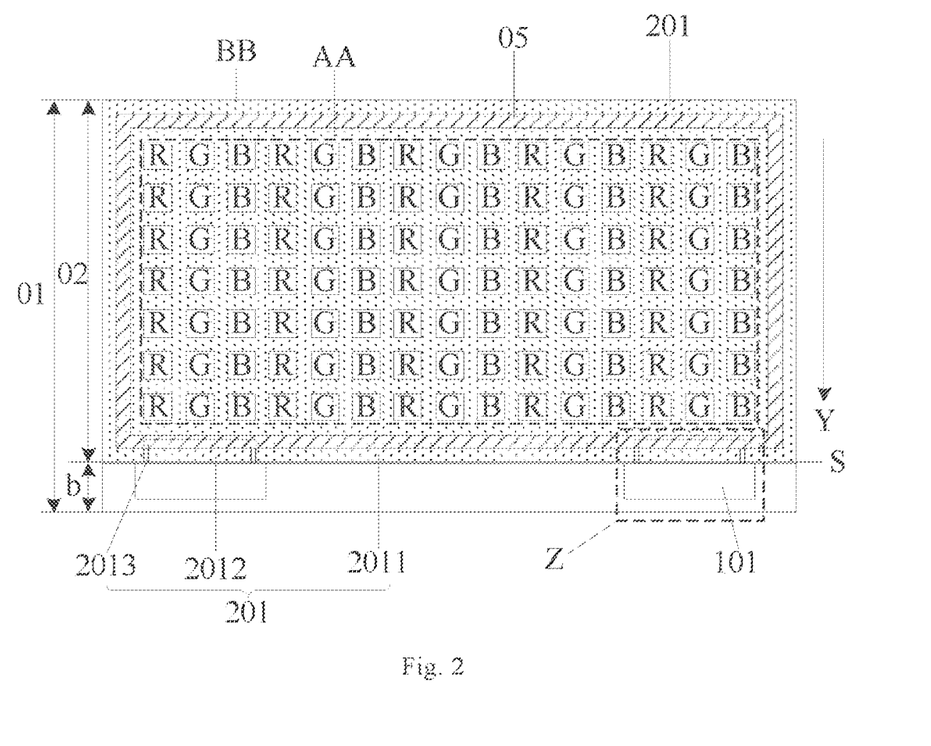
FIG. 2 is a schematic structural diagram of a display panel according to an embodiment of the present disclosure.
Figure 6:
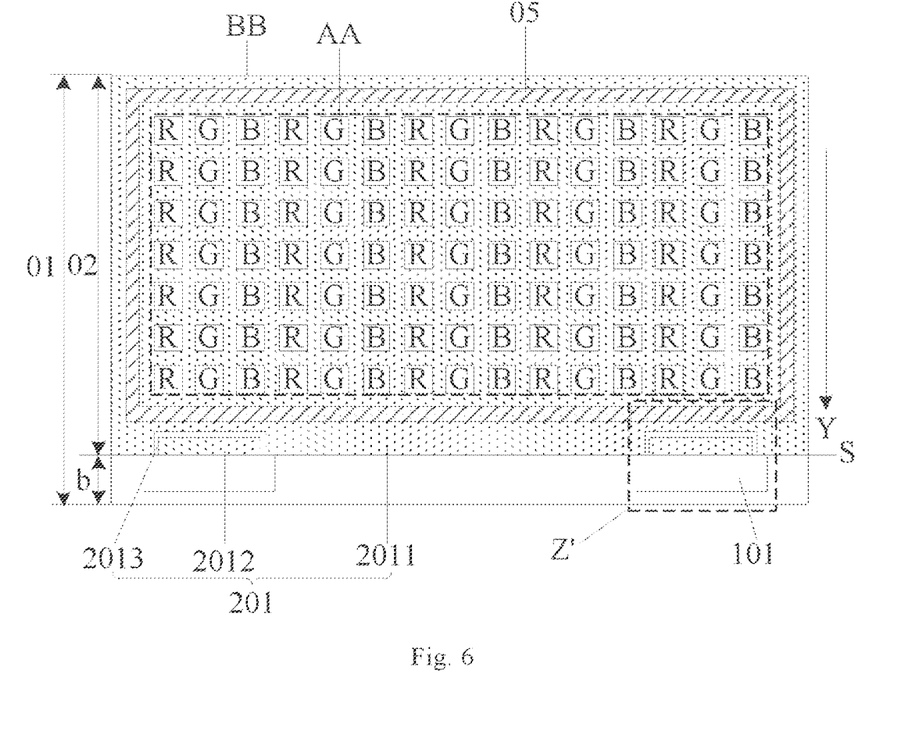
FIG. 6 is a schematic structural diagram of a display panel according to an embodiment of the present disclosure.

In some implementations, as shown in FIGS. 2 and 6, the display panel provided by the embodiment of the present disclosure may further include a sealant 05 surrounding the display area AA, and the isolation trench 2013 may be disposed on a side of the sealant 05 close to the bonding area b, so as to effectively block the conductive adhesive 03.

Figure 4:
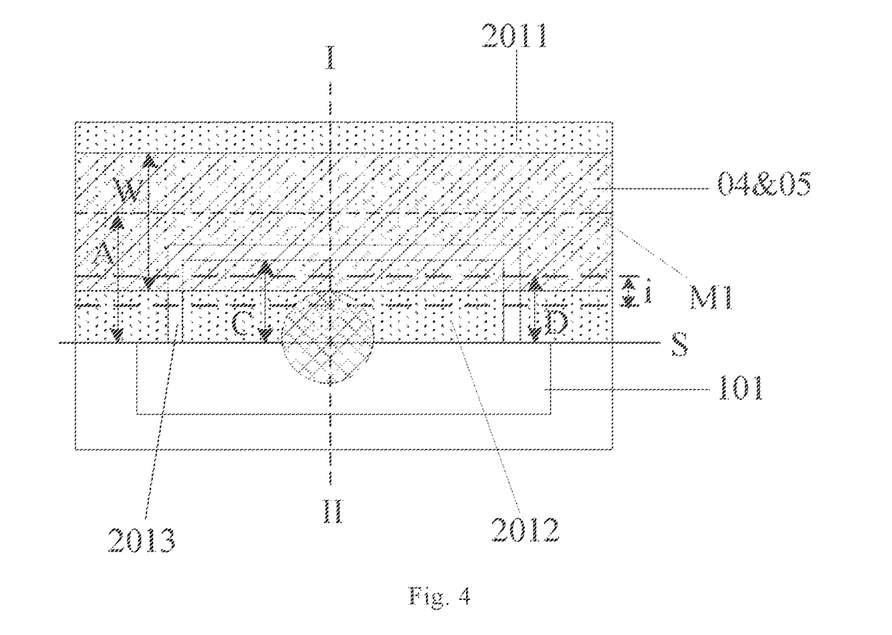
FIG. 4 is a schematic diagram illustrating a calculation of positions of a sealant and a first isolation sub-trench.
Figure 5:
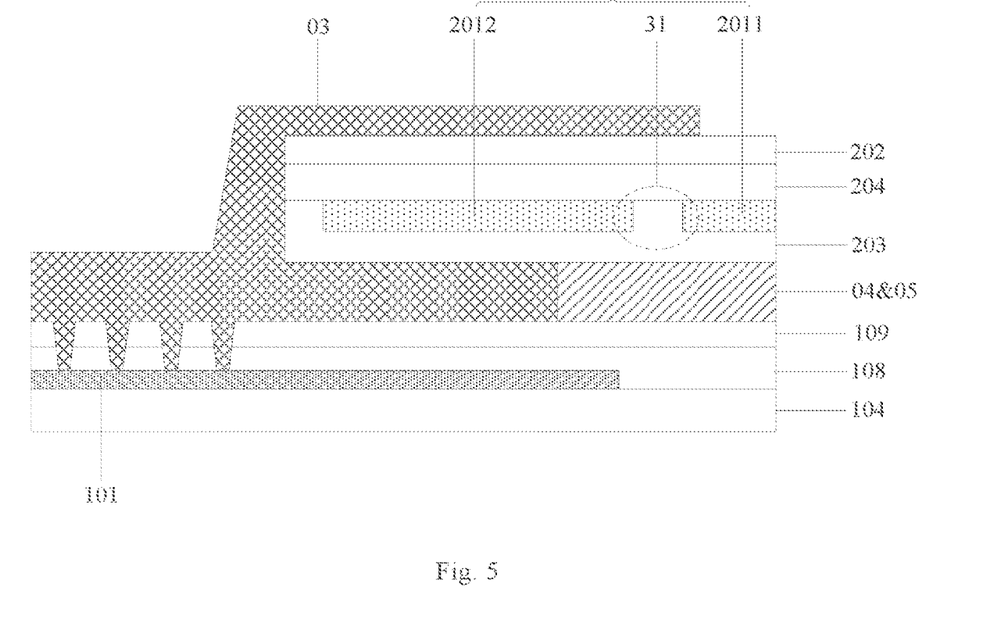
FIG. 5 is a schematic cross-sectional view taken along line I-II of FIG. 4.

In some implementations, in the display panel provided by the embodiment of the present disclosure, as shown in FIGS. 3 to 5, the sealant 05 may serve as the blocking structure 04, that is, the conductive adhesive 03 may be prevented from diffusing into the region, where the first part 2011 is located, by extending the sealant 05 in the related art to the side of the bonding area b so that the sealant 05 also serves as the blocking structure 04. Specifically, in FIG. 3, 04' denotes a boundary of the blocking structure 04 close to the bonding area b, and 05' denotes a boundary of the sealant 05 close to the bonding area b.

In consideration of a fluctuation of a width of the sealant 05 in actual productions, the isolation trench 2013 is to be designed in a non-fluctuation region of the width of the sealant 05. As shown in FIG. 4, the opposite substrate 02 includes a first side surface S adjacent to the bonding area b, A is a distance between an orthographic projection of a center line M1 of the sealant 05, in a direction parallel to the first side surface S, on the array substrate 01 and an orthographic projection of the first side surface S on the array substrate 01, W is a preset width of the sealant 05 in a direction (i.e., Y direction) perpendicular to the first side surface S, C is a distance between the first isolation sub-trench 31 and the first side surface S, D is a distance between an orthographic projection of the sealant 05 on the array substrate 01 and an orthographic projection of the first side surface S on the array substrate 01, i is a fluctuation coefficient of the width of the sealant 05 in a range of ±10%, in order to ensure that the isolation trench 2013 is always disposed in a region where the sealant 05 is located, it is desired that C>Dmax, D=A−(1−i)*W/2, and thus C>A−(1−i)*W/2. That is, the distance between the orthographic projection of the blocking structure 04 on the array substrate 01 and the orthographic projection of the first side surface S on the array substrate 01 is desired to be less than the distance between the orthographic projection of the first isolation sub-trench 31 on the array substrate 01 and the orthographic projection of the first side surface S on the array substrate 01.

It should be noted that the fluctuation coefficient i of the width of the sealant 05 is related to the equipment for coating the sealant 05, and the fluctuation coefficient i of the width of the sealant 05 may be varied for different equipment, and specifically, a technician can flexibly adjust the fluctuation coefficient i of the width of the sealant 05 according to the equipment actually used, which is not specifically limited herein.

In some implementations, in the display panel provided by the embodiment of the present disclosure, as shown in FIGS. 6 to 15, in a case where the blocking structure 04 and the sealant 05 are not common, i.e., the sealant 05 is not configured to serve as the blocking structure 04, the blocking structure 04 may be disposed on a side of the sealant 05 close to the bonding area b, and a gap is to be reserved between the blocking structure 04 and the sealant 05 to prevent a thickness at an edge of the panel from being inconsistent due to a contact and a superposition between the blocking structure 04 and the sealant 05, which affects the yield of the product.

In some implementations, the blocking structure 04 and the sealant 05 may be made of a same material in a same layer, so as to save a process of separately manufacturing the blocking structure 04 and improve the production efficiency. In this case, the blocking structure 04 may be referred to as a Dummy Seal.

Figure 8:
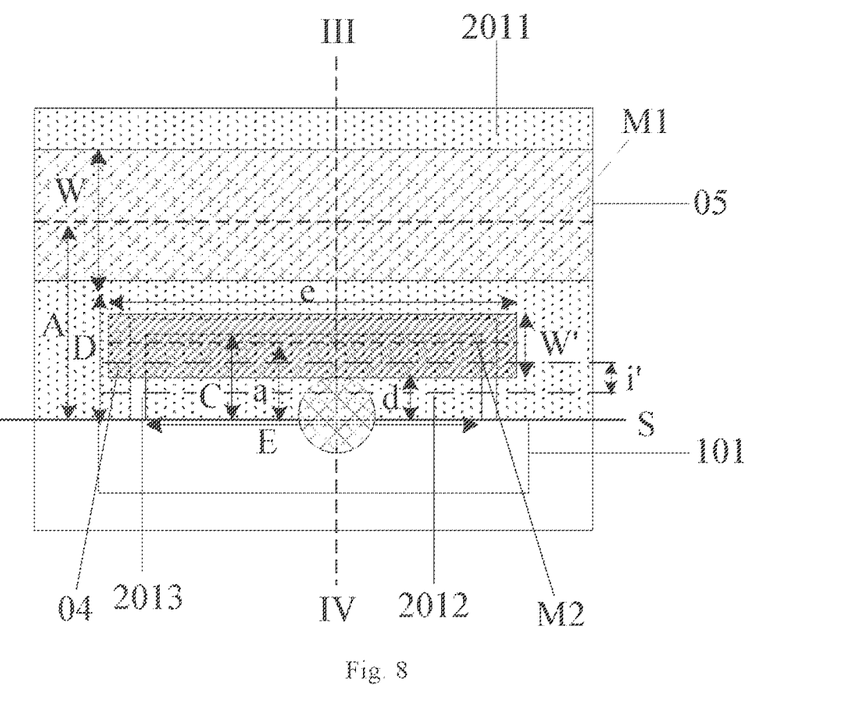
FIG. 8 is a schematic diagram illustrating a calculation of positions of a blocking structure and a first isolation sub-trench in FIG. 7.
Figure 9:
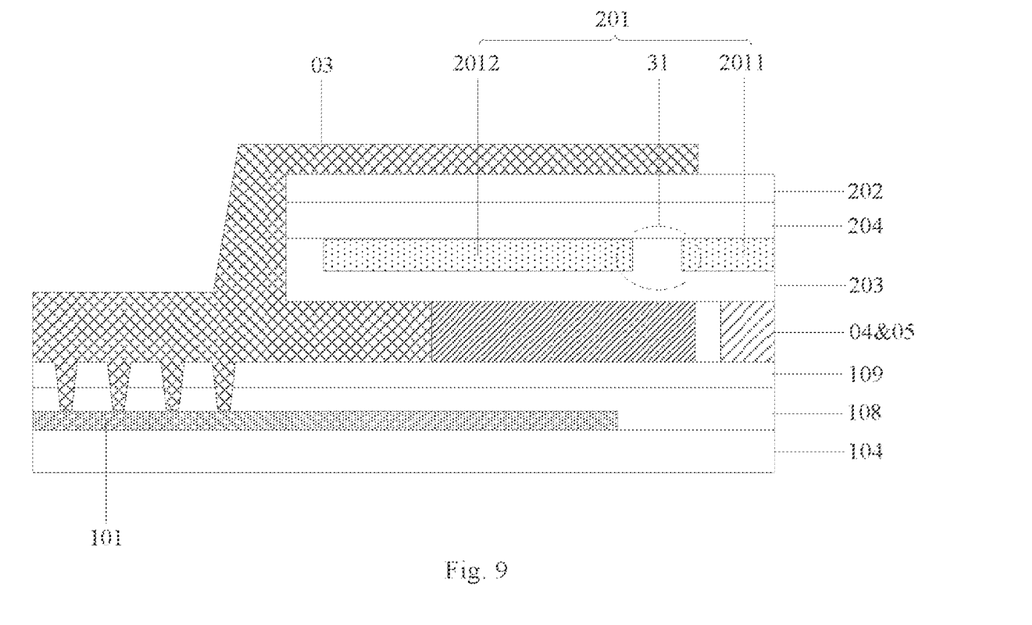
FIG. 9 is a schematic cross-sectional view taken along line III-IV of FIG. 8.

In the case of separately manufacturing the blocking structure 04, as shown in FIGS. 8, 11 and 14, the opposite substrate 02 includes a first side surface S adjacent to the bonding area b, A is a distance between an orthographic projection of a center line M1 of the sealant 05 in a direction parallel to the first side surface S on the array substrate 01 and an orthographic projection of the first side surface S on the array substrate 01, W is a preset width of the sealant 05 in a direction (i.e., Y direction) perpendicular to the first side surface S, C is a distance between the first isolation sub-trench 31 and the first side surface S, D is a distance between an orthographic projection of the sealant 05 on the array substrate 01 and an orthographic projection of the first side surface S on the array substrate 01, i' is a fluctuation coefficient of a width of the blocking structures 04 in a range of ±10%. In a case where the blocking structure 04 is made of the same material in the same layer as the sealant 05, i'=i, E is a length of the first isolation sub-trench 31 in the direction parallel to the first side surface S, W' is a width of the blocking structure 04 in the direction perpendicular to the first side surface S, e is a length of the blocking structure 04 in the direction parallel to the first side surface S, a is a distance between an orthographic projection of a center line M1 of the blocking structure 04 in the direction parallel to the first side surface S on the array substrate 01 and the orthographic projection of the first side surface S on the array substrate 01, d is a distance between an orthographic projection of the blocking structure 04 on the array substrate 01 and the orthographic projection of the first side surface S on the array substrate 01, and e is a length of the blocking structures 04 in the direction parallel to the first side surface S.

In order that the blocking structure 04 can effectively block the conductive adhesive 03 and cannot interfere with the sealant 05, following conditions are to be satisfied: (a), in order that the first isolation sub-trench 31 is in the region where the blocking structure 04 is located, a≤C is to be satisfied; (b), in order that the blocking structure 04 and the sealant 05 do not interfere with each other, d+W'<D is to be satisfied; (c), in order that the blocking structure 04 does not exceed the opposite substrate 02, d>0 is to be satisfied; (d), in response to that the blocking structure 04 fluctuates to the maximum value (i.e., d=a−(1+i')*W'/2), the above conditions (b) and (c) are to be satisfied simultaneously; (e), in order that the length of the blocking structure 04 is greater than or equal to the length of the first isolation sub-trench 31, e≥E is to be satisfied.

The above conditions can be converted into the following formula:

$$a \leq C; a + (1 + i') * W'/2 < D; a - (1 + i') * W'/2 > 0; e \leq E.$$

Therefore, the purpose that the blocking structure 04 can effectively block the conductive adhesive 03 and cannot interfere with the sealant 05 can be achieved by satisfying the above formula.

It should be noted that, since the blocking structure 04 and the sealant 05 in FIGS. 8, 11 and 14 are independently disposed and a gap exists therebetween, the blocking structure 04 and the first isolation sub-trench 31 in FIGS. 11 and 14 also satisfy the above formula for the same reason as that in FIG. 8.

In some implementations, in the display panel provided by the embodiment of the present disclosure, as shown in FIGS. 2 and 6, the opposite substrate 02 includes a first side surface S adjacent to the bonding area b, isolation trenches 2013 may be disposed at two edges of the first side surface S, and the isolation trenches 2013 are disposed between the display area AA and the bonding area b. In some implementations, positions and the number of the isolation trenches 2013 may be flexibly set according to contact points between the conductive adhesive 03 and the ground terminal 101, as long as the effect of isolating the region where the conductive adhesive 03 is coated can be achieved, which is not particularly limited herein.

In some implementations, in the display panel provided by the embodiment of the present disclosure, the conductive adhesive 03 may be a conductive silver adhesive with better conductivity.

Figure 16:
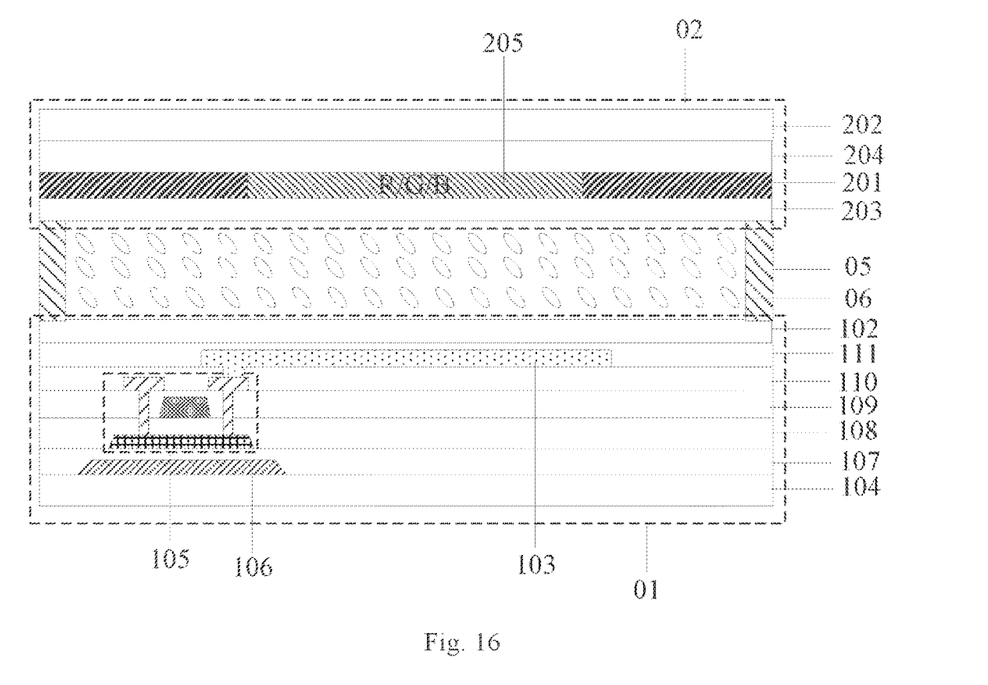
FIG. 16 is a schematic cross-sectional view of a structure of a sub-pixel in a display panel according to an embodiment of the present disclosure.

In some implementations, as shown in FIG. 16, the display panel provided by the embodiment of the present disclosure may further include a liquid crystal layer 06, the liquid crystal layer 06 is disposed in the display area AA, and the liquid crystal layer 06 is sealed between the opposite substrate 02 and the array substrate 01. The array substrate 01 may further include a common electrode layer 102 and a pixel electrode layer 103 in the display area AA, and the common electrode layer 102 and the pixel electrode layer 103 are stacked and insulated from each other. In some implementations, as shown in FIG. 16, the common electrode layer 102 may be disposed on a side of the pixel electrode layer 103 close to the liquid crystal layer 06, and in some implementations, the common electrode layer 102 may be disposed on a side of the pixel electrode layer 103 away from the liquid crystal layer 06, which is not particularly limited herein.

In addition, as shown in FIG. 16, the array substrate 01 may further include a first base substrate 104, a transistor 105, a light blocking layer 106, a buffer layer 107, a gate insulating layer 108, an interlayer dielectric layer 109, a resin layer 110, an insulating layer 111, and the like. The opposite substrate 02 may further include a planarization layer 203, a second base substrate 204 and a color filter 205, the planarization layer 203 is fully disposed on a side of the black matrix 201 facing the array substrate 01, and the color filter 205 may include a red color filter R, a green color filter G and a blue color filter B.

For other components (such as alignment layers, polarizers, etc.) known to those skilled in the art in the display panel, reference may be made to the related art, which will not be specifically described herein.

Based on the same inventive concept as above, an embodiment of the present disclosure further provides a display device including the display panel provided by the embodiment of the present disclosure. Since the principle of the display device for solving the problem in the related art is similar to that of the display panel, for the implementation of the display device provided by the embodiment of the present disclosure, reference may be made to the implementations of the display panel described above, and repeated descriptions are omitted.

In some implementations, the display device may be any product or component with a display function, such as a mobile phone, a tablet computer, a television, a display, a notebook computer, a digital photo frame, a navigator, an intelligent watch, a fitness wrist strap, and a personal digital assistant. The display device includes, but is not limited to, elements such as a radio frequency unit, a network module, an audio output unit, an input unit, a sensor, a display unit, a user input unit, an interface unit, a memory, a processor, and a power supply. In addition, it should be understood by those skilled in the art that the above-described structure does not constitute a limitation on the above-described display device provided by the embodiment of the present disclosure, in other words, more or less elements described above may be included in the above-described display device provided by the embodiment of the present disclosure, or some elements may be combined, or different elements may be included.

It will be apparent to those skilled in the art that various modifications and variations may be made in the embodiments of the present disclosure without departing from the spirit and scope of the embodiments of the present disclosure. Thus, if the modifications and variations of the embodiments of the present disclosure are within the scope of the claims of the present disclosure and their equivalents, the present disclosure is intended to encompass the modifications and variations.

The invention claimed is:

1. A display panel, comprising:
an array substrate having a display area and a frame area disposed around the display area, at least part of the frame area on a side of the display area serving as a bonding area, and the bonding area of the array substrate being provided therein with a ground terminal;
an opposite substrate opposite to the array substrate, an orthographic projection of the opposite substrate on the array substrate being not overlapped with the bonding area, the opposite substrate comprising a black matrix disposed on a side of the opposite substrate facing the array substrate, and a transparent conductive layer disposed on a side of the opposite substrate away from the array substrate, the black matrix comprising a first part, a second part and an isolation trench, the first part, the isolation trench and the second part being sequentially disposed in a direction from the display area to the bonding area, and the isolation trench isolating the first part from the second part;
a conductive adhesive connecting the ground terminal with the transparent conductive layer, a part of the conductive adhesive being filled between the array substrate and the opposite substrate, and an orthographic projection of the part of the conductive adhesive on the array substrate being not overlapped with an orthographic projection of the first part on the array substrate; and
a blocking structure filled between the array substrate and the opposite substrate, the blocking structure being in contact with the part of the conductive adhesive and configured for preventing the conductive adhesive, before being cured, from overflowing into a region where the first part is located,
wherein the opposite substrate comprises a first side surface adjacent to the bonding area,
the isolation trench comprises a first isolation sub-trench parallel to the first side surface, and a second isolation sub-trench and a third isolation sub-trench which extend to the first side surface respectively from two ends of the first isolation sub-trench,
wherein an orthographic projection of the blocking structure on the array substrate covers at least an orthographic projection of the first isolation sub-trench on the array substrate.

2. The display panel of claim 1, wherein an orthographic projection of the blocking structure on the array substrate covers orthographic projections of a part of the second isolation sub-trench adjacent to the first isolation sub-trench and a part of the third isolation sub-trench adjacent to the first isolation sub-trench on the array substrate.

3. The display panel of claim 2, wherein an orthographic projection of the blocking structure on the array substrate covers an orthographic projection of an edge of the first part adjacent to the first isolation sub-trench on the array substrate.

4. The display panel of claim 1, wherein an orthographic projection of the blocking structure on the array substrate covers an orthographic projection of an edge of the second part adjacent to the first isolation sub-trench on the array substrate.

5. The display panel of claim 4, wherein an orthographic projection of the blocking structure on the array substrate covers an orthographic projection of an edge of the first part adjacent to the first isolation sub-trench on the array substrate.

6. The display panel of claim 1, wherein an orthographic projection of the blocking structure on the array substrate covers an orthographic projection of an edge of the first part adjacent to the first isolation sub-trench on the array substrate.

7. The display panel of claim 1, further comprising:
a sealant surrounding the display area,
the isolation trench is disposed on a side of the sealant close to the bonding area.

8. The display panel of claim 7, wherein the sealant serves as the blocking structure.

9. The display panel of claim 8, wherein the sealant and the first isolation sub-trench satisfy a relation of $C > A - (1-i)*W/2$,
the opposite substrate comprises a first side surface adjacent to the bonding area, A is a distance between an orthographic projection of a center line, in a direction parallel to the first side surface, of the sealant on the array substrate and an orthographic projection of the first side surface on the array substrate, W is a preset width of the sealant in a direction perpendicular to the first side surface, C is a distance between the first isolation sub-trench and the first side surface, and i is a fluctuation coefficient of a width of the sealant in a range of $\pm 10\%$.

10. The display panel of claim 7, wherein the blocking structure is disposed on a side of the sealant close to the bonding area, and a gap exists between the blocking structure and the sealant.

11. The display panel of claim 10, wherein the blocking structure and the first isolation sub-trench satisfy relations:

$$a \leq C; a + (1+i')*W'/2 < D; a - (1+i')*W'/2 > 0; e \geq E;$$

wherein the opposite substrate comprises a first side surface adjacent to the bonding area, a is a distance between an orthographic projection of a center line, in a direction parallel to the first side surface, of the blocking structure on the array substrate and an orthographic projection of the first side surface on the array substrate, C is a distance between the first isolation sub-trench and the first side surface, D is a distance between an orthographic projection of the blocking structure on the array substrate and an orthographic projection of the first side surface on the array substrate, E is a length of the first isolation sub-trench in the direction parallel to the first side surface, W' is a preset width of the blocking structure in a direction perpendicular to the first side surface, i' is a fluctuation coefficient of a width of the blocking structure in a range of ±10%, and e is a length of the blocking structure in the direction parallel to the first side surface.

12. The display panel of claim 1, wherein the opposite substrate comprises a first side surface adjacent to the bonding area, isolation trenches are disposed at two edges of the first side surface, and the isolation trenches are disposed between the display area and the bonding area.

13. The display panel of claim 1, further comprising:
a liquid crystal layer disposed in the display area and sealed between the opposite substrate and the array substrate.

14. The display panel of claim 1, wherein the array substrate further comprises a common electrode layer and a pixel electrode layer in the display area, and the common electrode layer and the pixel electrode layer are stacked and insulated from each other.

15. The display panel of claim 1, further comprising:
a planarization layer fully disposed on a side, facing the array substrate, of the black matrix.

16. The display panel of claim 1, wherein the conductive adhesive is a conductive silver adhesive.

17. A display device, comprising the display panel of claim 1.

18. A display panel, comprising:
an array substrate having a display area and a frame area disposed around the display area, at least part of the frame area on a side of the display area serving as a bonding area, and the bonding area of the array substrate being provided therein with a ground terminal;
an opposite substrate opposite to the array substrate, an orthographic projection of the opposite substrate on the array substrate being not overlapped with the bonding area, the opposite substrate comprising a black matrix disposed on a side of the opposite substrate facing the array substrate, and a transparent conductive layer disposed on a side of the opposite substrate away from the array substrate, the black matrix comprising a first part, a second part and an isolation trench, the first part, the isolation trench and the second part being sequentially disposed in a direction from the display area to the bonding area, and the isolation trench isolating the first part from the second part;
a conductive adhesive connecting the ground terminal with the transparent conductive layer, a part of the conductive adhesive being filled between the array substrate and the opposite substrate, and an orthographic projection of the part of the conductive adhesive on the array substrate being not overlapped with an orthographic projection of the first part on the array substrate;
a blocking structure filled between the array substrate and the opposite substrate, the blocking structure being in contact with the part of the conductive adhesive and configured for preventing the conductive adhesive, before being cured, from overflowing into a region where the first part is located; and
a sealant surrounding the display area,
wherein the isolation trench is disposed on a side of the sealant close to the bonding area, the blocking structure is disposed on a side of the sealant close to the bonding area, and a gap exists between the blocking structure and the sealant.

19. A display panel, comprising:
an array substrate having a display area and a frame area disposed around the display area, at least part of the frame area on a side of the display area serving as a bonding area, and the bonding area of the array substrate being provided therein with a ground terminal;
an opposite substrate opposite to the array substrate, an orthographic projection of the opposite substrate on the array substrate being not overlapped with the bonding area, the opposite substrate comprising a black matrix disposed on a side of the opposite substrate facing the array substrate, and a transparent conductive layer disposed on a side of the opposite substrate away from the array substrate, the black matrix comprising a first part, a second part and an isolation trench, the first part, the isolation trench and the second part being sequentially disposed in a direction from the display area to the bonding area, and the isolation trench isolating the first part from the second part;
a conductive adhesive connecting the ground terminal with the transparent conductive layer, a part of the conductive adhesive being filled between the array substrate and the opposite substrate, and an orthographic projection of the part of the conductive adhesive on the array substrate being not overlapped with an orthographic projection of the first part on the array substrate; and
a blocking structure filled between the array substrate and the opposite substrate, the blocking structure being in contact with the part of the conductive adhesive and configured for preventing the conductive adhesive, before being cured, from overflowing into a region where the first part is located,
wherein the opposite substrate comprises a first side surface adjacent to the bonding area,
the isolation trench comprises a first isolation sub-trench parallel to the first side surface, and a second isolation sub-trench and a third isolation sub-trench which extend to the first side surface respectively from two ends of the first isolation sub-trench,
wherein an orthographic projection of the blocking structure on the array substrate covers an orthographic projection of an edge of the second part adjacent to the first isolation sub-trench on the array substrate,
wherein an orthographic projection of the blocking structure on the array substrate covers an orthographic projection of an edge of the first part adjacent to the first isolation sub-trench on the array substrate.

* * * * *